United States Patent [19]
Myers

[11] Patent Number: 6,026,642
[45] Date of Patent: Feb. 22, 2000

[54] TORQUE CONVERTER ADAPTER SYSTEM

[76] Inventor: John E. Myers, 2010 Kleppe La., Sparks, Nev. 89431

[21] Appl. No.: 09/113,034

[22] Filed: Jul. 9, 1998

[51] Int. Cl.[7] .................................................... F16D 41/06
[52] U.S. Cl. ................................................................ 60/345
[58] Field of Search ........................... 60/345; 416/197 C; 192/41 R, 46

[56] References Cited

U.S. PATENT DOCUMENTS

| | | | |
|---|---|---|---|
| 5,094,076 | 3/1992 | Henricks | 60/345 |
| 5,125,487 | 6/1992 | Hodge | 60/345 X |
| 5,586,434 | 12/1996 | Okubo et al. | 60/345 |
| 5,779,014 | 7/1998 | Kinoshita et al. | 192/41 R |
| 5,829,565 | 11/1998 | Fergle et al. | 192/46 |
| 5,855,263 | 1/1999 | Fergle | 192/46 |

*Primary Examiner*—John E. Ryznic
*Attorney, Agent, or Firm*—Theodore J. Bielen, Jr.

[57] ABSTRACT

A system for adapting a particular sprag unit to an existing stator of a torque converter having a ring-shaped body with an inner surface and a driving member. The system includes an annular retainer possessing an outer surface which fits along the inner surface of the stator. The retainer further includes an inner surface which slidingly engages a particular sprag unit having a plurality of sprags. The outer surface of the annular retainer is connected to the inner surface of the stator to prevent relative movement between these two elements. The sprag unit also contacts the surface of an inner race which possesses a central opening for meshing with a driving member may include a race having an outer surface which also engages the sprags of the clutch.

6 Claims, 2 Drawing Sheets

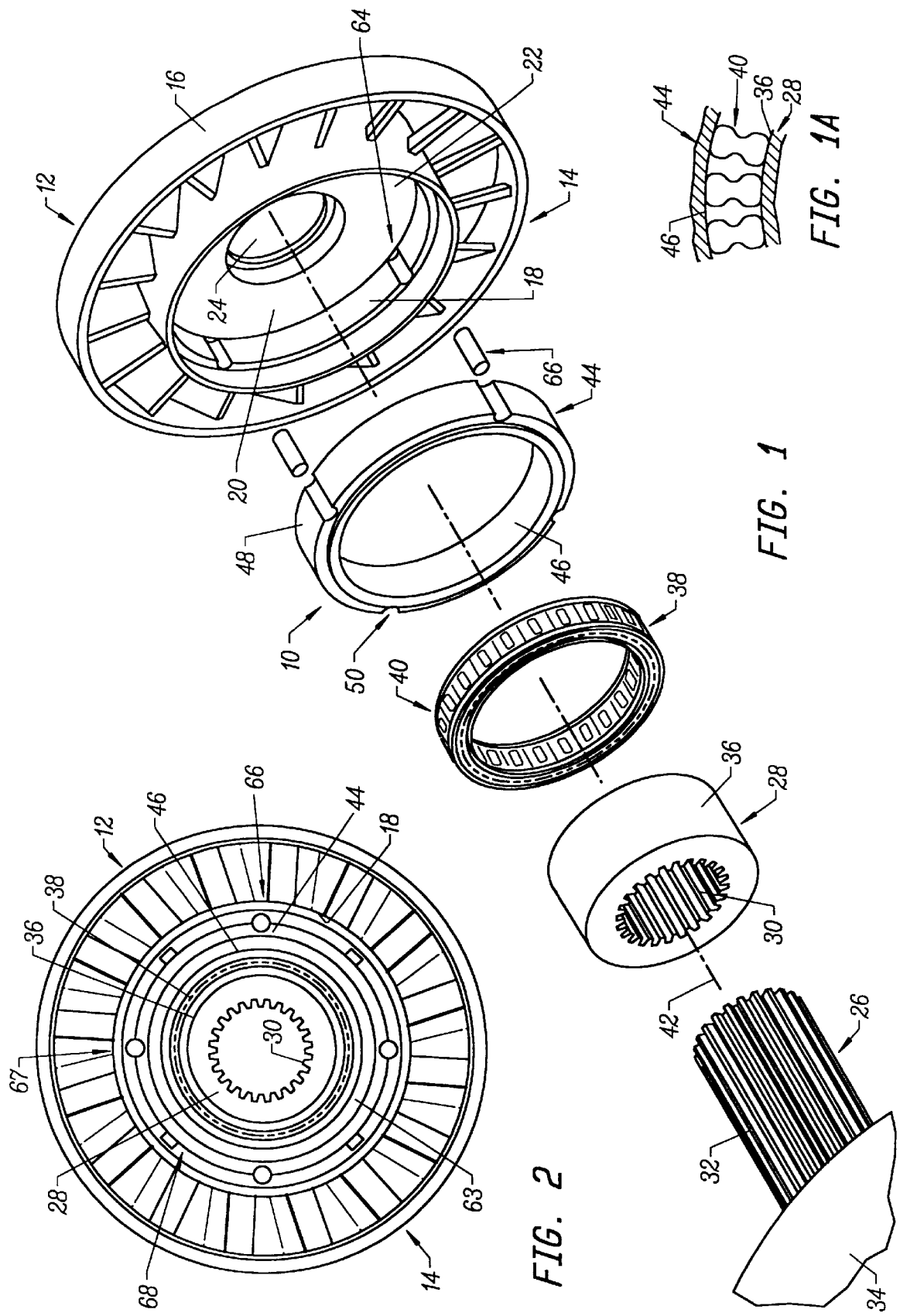

TORQUE CONVERTER ADAPTER SYSTEM

BACKGROUND OF THE INVENTION

The present invention relates to a novel and useful torque converter adapter system.

Clutch sprag units or freewheels are a normal part of a torque converter system found in many vehicles. In general, such sprags units are satisfactory during the normal operation of a vehicle. Typically, caged sprags are found in such units and are of the spring and roller type. That is to say, sprags, dogs, or gripping rollers engage in inner race linked to a drive mechanism and to the stator. When this occurs, the stator detaches itself from the torque converter housing and rotates along with the turbine portion of the torque converter to provide a fluid coupling. In other words, when the grip rollers or sprags of the sprag unit are jammed into spaces within the freewheel, the freewheel or sprag unit becomes locked and transmits force. Conversely, when the thrusting force in the vehicle torque converter decreases or reverses its direction, the rollers are released allowing an adjacent collar wheel to rotate freely.

When vehicles are operated in high horse power applications, i.e. during racing, conventional freewheels utilizing spring and roller type structures are prone to breakdown. Typically, the outer race is often split in this environment. It has been theorized that conventional, freewheels having grip rollers usually includes an inadequate number of rollers for use under such high torque conditions.

A system which is capable of adapting a sprag unit of more durable construction in an existing stator within a torque converter would be a notable advance in the field of transmissions used in racing conditions.

SUMMARY OF THE INVENTION

In accordance with the present invention a novel and useful torque converter adapter system is herein provided.

The system of the present invention is used in conjunction with a stator having a ring-shaped body and an inner surface. Stator is usually used in conjunction with a driving member including a shaft meshed to an inner race with an outer surface.

The present invention includes an annular retainer which possesses an outer surface fitting along the inner surface of the stator. The retainer further includes an endless inner surface which may be of smooth configuration. Means is included for connecting the outer surface of the annular retainer to the inner surface of the stator to prevent relative movement therewith. Such connection means many take the form of plurality of pins which are fictionally placed in engagement between the annular retainer and the stator. The pins may be positioned by providing a plurality of bores through the annular retainer and the stator, which aligned with one another. Lubrication is also provided through the retainer.

In addition, a sprag unit or free wheel is included in the present invention and possesses a selected number of study sprags. The sprags slidingly simultaneously engage the inner surface of the annular retainer and the outer surface of the inner race. As heretofore described, the engagement or lock-up of the sprags on the inner surface of the annular retainer and the outer surface of the inner race permits the sprag unit to act as a clutch to transmit force in a torque converter. The sprag unit may include sprags of a sturdy configuration and in a number sufficient to work under high torque conditions of operation of the vehicle. For example, the sprags may be of a "dog bone" type, known in the art.

It may be apparent that a novel and useful torque converter adapter system has been described.

It is therefor an object of the present invention to provide a torque converter adapter system which permits the utilization of a stator of a certain configuration with a sprag unit of high durability.

Another object of the present invention is to provide a torque converter adapter system which utilizes a sprag unit of great durability of to be retrofitted into a torque converter stator of the prior art.

A further object of the present invention is to provide a torque converter adapter system which is capable of employing a sprag unit of great durability which permits the torque converter to operate in high torque conditions such as those found when racing vehicles.

A further object of the present invention is to provide a torque converter adapter system which employs a sprag unit of great durability to prevent mechanical breakdown of the torque converter transmission of a racing vehicle.

The invention possesses other objects and advantages especially as concerns particular characteristics and features thereof which will become apparent as the specification continues.

BRIEF DESCRIPTION OF THE DRAWINGS

FIG. 1 is an exploded view depicting the converter system of the present invention.

FIG. 1A is a partial sectional view showing the plurality of sprags of the sprag unit between the retainer surface and the inner race surface.

FIG. 2 is a front elevational view of the system of the present invention in place within a stator and in conjunction with an inner race known in the art.

Figure 3:
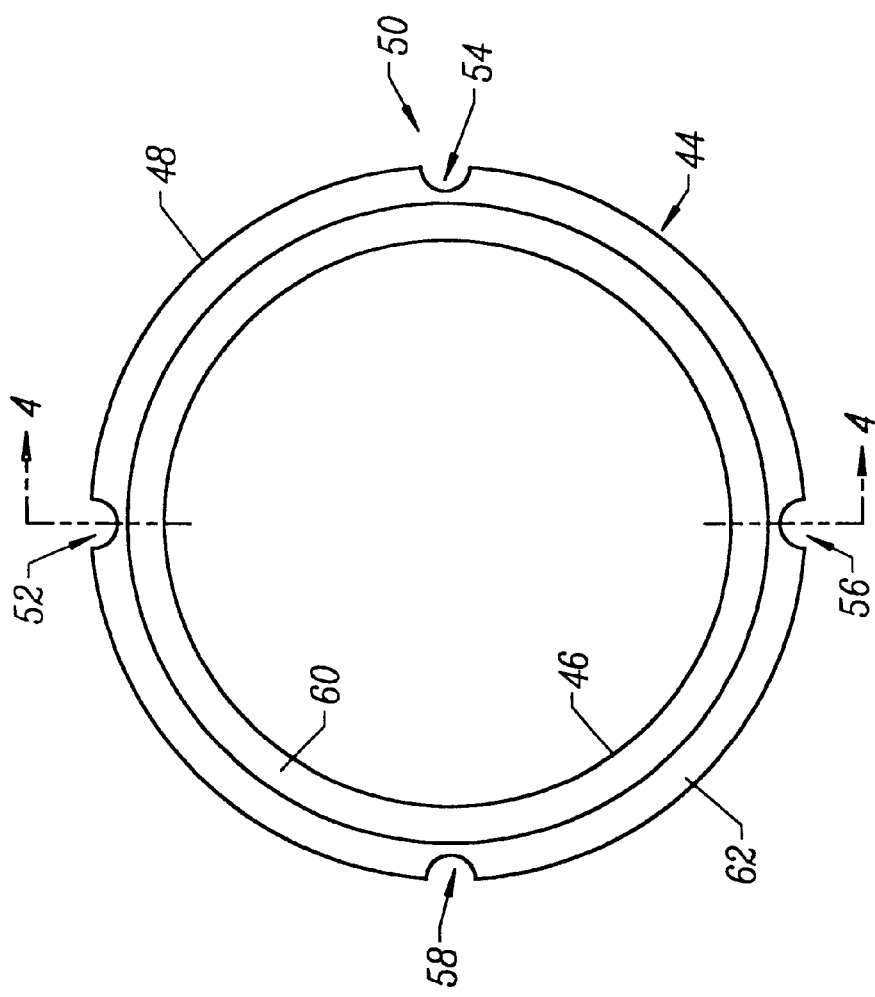
FIG. 3 is a front elevational view of the retainer portion of the adapter system of the present invention.

For a better understanding of the invention references made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiment thereof which should be taken in conjunction with the drawings heretofore described.

The invention as a whole is depicted in the drawings by reference character 10. System 10 is used in conjunction with a stator 12 having a plurality of vanes 14. Stator 12 is used in conjunction with a torque converter, which is the intended application of the system of the present invention. Stator 12 is formed with a ring-shaped body having an outer curved surface 16 and an inner surface 18. Wall portion 20 forms an open cavity 22 having a central opening 24 to accept driving mechanism shaft 26. Shaft 26 is used with an inner race 28 having a geared or splined surface 30. Splined surface 30 meshingly engages convex spline surface 32 of driving shaft 26. The remaining portions 34 of a torque converter are not shown but are of conventional configuration. For example, torque converter portion 34 may represent a washer or a portion of the turbine assembly of the torque converter. In a normal configuration, a conventional sprag unit fits around outer surface 36 of inner race 28 and against inner surface 18 of stator 12.

The system of 10 of the present invention permits the insertion of a sprag unit 28 which typically is sturdier than a conventional sprag unit normally used with stator 12. With reference to FIG. 1A, it may be observed that a plurality of sprags 40, which are each configured and referred to as a "dog bone". It has been proven that sprag unit 38 possessing this type of sprag in relatively large number renders the altered torque converter portion depicted in FIG. 1 superior during high torque uses of the vehicle employing such a torque converter. For example, such a torque converter would be useable in vehicle racing activities. In any case, it is well known that sprag unit 38 serves as a freewheel or clutch to lock race 28 and stator 12 together when the stator 12 acts in one direction about axis 42.

Figure 4:
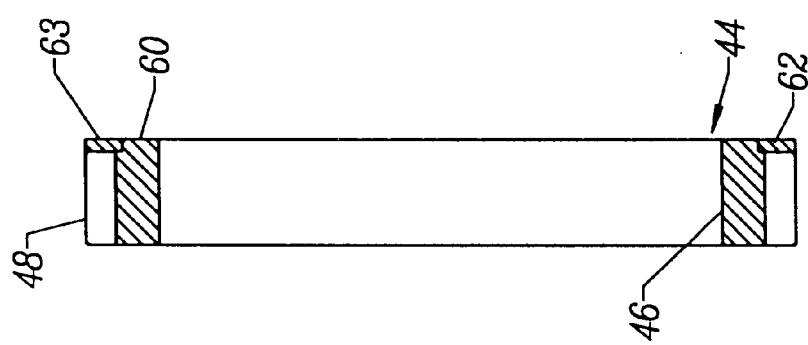
FIG. 4 is a sectional view taken along line 4—4 of FIG. 3.

System 10 includes an annular retainer 44 which includes a smooth curved inner surface 46 and a curved outer surface 48. Annular retainer 44 is constructed with a quartet of semicircular bores 50 which interrupt curved outer surface 48. With reference to FIGS. 3 and 4, it may be observed that annular retainer 44 is depicted in detail in which plurality of bores 50 are identified as bores 52, 54, 56, and 58. Ridge 60 of generally circular configuration leaves a recessed surface 62 in surrounding configuration with ridge 60. Thus, a retainer ring 64, FIG. 4, is capable of fitting on recess surface 62 (not shown in FIG. 1). With reference to FIGS. 1 and 2, however, it should be apparent that annular retainer 44 fits over sprag unit 38 and within stator 12 atop inner curved surface 18 thereof. It should be seen that inner curved surface 18 also includes a plurality of semicircular bores 64 which align with plurality of semicircular bores 50 of retainer 44. Plurality of pins 66 (two shown in FIG. 1) sit within plurality of bores 50 of annular retainer 54 and plurality of bores 64 along surface 18 of stator 12 to firmly hold retainer 44 to stator 12. Rectangular openings 68, best shown in FIG. 2, serve to distribute lubrication through stator 12, annular retainer 44, and sprag unit 38.

In operation, system 10 is employed by utilizing the conventional stator 12, inner race 28 and driving mechanism shaft 26. A sprag unit 38 may be inserted in the assembly shown in FIGS. 1 and 2 to add strength to a torque converter by its sturdy construction. Retainer 44 is placed within stator 12 such that outer surface 48 of the same lies against inner surface 18 of stator 12. Plurality of semicircular bores 50 found on outer surface 48 and annular retainer 44 are aligned with the plurality of bores 64 found on the inner surface 18 of stator 12. Plurality of pins 66 are then driven into the circular openings 67, FIG. 2, formed by the combination of bores 44 and 64 to hold retainer to stator 12. Sprag unit 38 is then placed within annular retainer 48 along inner surface 46 of the same. Inner race 28 is placed within sprag unit 38 such that outer surface 36 and inner surface 46 of annular retainer 48 lie against plurality of sprags 40 of sprag unit 38. Thus, sprag unit 38 having sprags 40 may lock-up between inner race 28 and the connected retainer 44 and stator 12. Retaining ring 63 fits over recess surface 62 of annular retainer 44 as depicted in FIG. 4. Thus, system 10 of the present invention permits the adaption of a sturdy sprag unit, such as sprag unit 38, which renders the portion of the torque converter depicted in FIG. 1 and 2 for use during high torque operations of a vehicle.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A torque converter adapter system used in conjunction with a stator having ring-shaped body with an inner surface and a driving having an inner race with an outer surface, comprising:

a. an annular retainer, said retainer possessing an outer surface fitting along the inner surface of the stator, said retainer further including an endless inner surface;

b. connection means for holding said outer surface of said annular retainer to the inner surface of the stator to prevent relative movement therebetween;

c. a sprag unit possessing a selected number of sprags, said sprag slidingly engaging said inner surface of said annular retainer, said sprag unit further including a central opening for permitting said sprag to slidingly engage the outer surface of the inner race, and in which said connection means for holding said outer surface of said annular retainer to the inner surface of the stator comprises a plurality of pins each fictionally engaging said annular retainer and the stator.

2. The system of claim 1 in which said connection means further comprises a plurality of bores through said annular retainer to accommodate said plurality of pins.

3. The system of claim 2 in which said connection means further comprises a plurality of bores through the stator alignable with each of said plurality of bores through said retainer for accommodating said plurality of pins.

4. The system of claim 1 in which said inner surface of said annular retainer is a smooth surface.

5. The system of claim 1 in which said connection means further comprises a plurality of bores through said annular retainer to accommodate said plurality of pins.

6. The system of claim 5 in which said connection means further comprises a plurality of bores through the stator alignable with each of said plurality of bores through said retainer for accommodating said plurality of pins.

\* \* \* \* \*